United States Patent [19]

Erbes et al.

[11] Patent Number: 4,757,535
[45] Date of Patent: Jul. 12, 1988

[54] SYSTEM FOR ENCRYPTED INFORMATION TRANSMISSION

[75] Inventors: Norbert Erbes, Karlsruhe; Dietrich Rother, Tamm, both of Fed. Rep. of Germany

[73] Assignee: Alcatel N.V., Amsterdam, Netherlands

[21] Appl. No.: 865,496

[22] Filed: May 20, 1986

[30] Foreign Application Priority Data

May 23, 1985 [DE] Fed. Rep. of Germany ....... 3518462

[51] Int. Cl.⁴ .............................................. H04L 9/00
[52] U.S. Cl. ........................................ 380/48; 380/44; 380/28
[58] Field of Search ...................... 380/48, 28, 44, 43, 380/49; 342/45; 375/114, 113, 116; 370/106

[56] References Cited

U.S. PATENT DOCUMENTS

| 3,949,397 | 4/1976 | Wagner et al. | 342/45 |
| 4,434,322 | 2/1984 | Ferrell | 380/48 |
| 4,484,027 | 11/1984 | Lee et al. | 380/48 |

Primary Examiner—Salvatore Cangialosi
Assistant Examiner—Aaron J. Lewis
Attorney, Agent, or Firm—Christie, Parker & Hale

[57] ABSTRACT

A system for encrypted information transmission is disclosed in which so-called recording interference is suppressed. Encryption is effected by means of a periodically recurring pseudo-noise sequence (key word). Synchronization between transmitter and receiver is produced by means of a sync word. During the period of validity of the key word, each sync word is used only once. At least the sync words already used or the information derived therefrom are stored in a sync-word memory (SP). If a sync word appears twice, this indicates recording interference, and the associated information is suppressed.

9 Claims, 1 Drawing Sheet

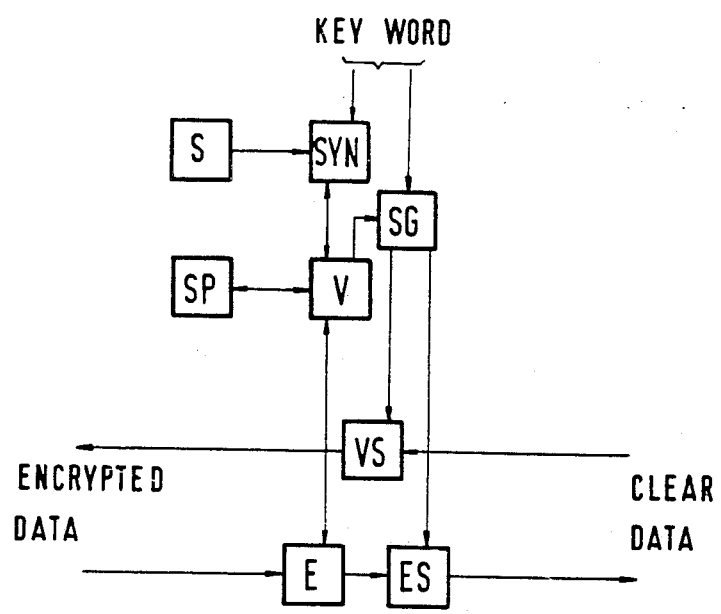

SYSTEM FOR ENCRYPTED INFORMATION TRANSMISSION

The present invention relates to a system as set forth in the preamble of claim 1. A system of this kind is disclosed in DE-OS No. 31 50 254.

Digital information is encrypted by means of periodically recurring pseudo-noise (PN) sequences. At the beginning of an information transmission, the PN sequences of the intercommunicating stations must be synchronized, i.e., they must have the same starting point within the cycle. Therefore, the transmitter generates a sync word, places it ahead of the encrypted message, and transmits the result to the receiver.

Particularly if the information is transmitted by radio, an intercepter can record a complete transmission, including the sync word, and retransmit it at a later time. At the receiving station, the transmission will then be decrypted, so that the operator of the receiving station can be misled considerably. This kind of interference is called "recording interference".

It is the object of the invention to provide a system of the above kind which is immune to "recording interference". This object is attained by the features set forth in claim 1. Further advantageous features of the invention are contained in the subclaims.

The invention has the advantage that the security of the information transmission can be increased with only minor increase in circuit complexity by transmitting only information characteristic of the sync word used rather than the sync word itself. In the duplex mode, with fast changes in the direction of transmission, the transmission of such information can even be dispensed with.

The invention will now be explained with the aid of three embodiments.

The single FIGURE is a block diagram showing the parts of a transmitting/receiving station which are essential to the invention.

As shown in the FIGURE, each transmitting/receiving station for radio or wire communication—henceforth called "radio set" without restricting the generality—includes a sync-word generator SYN and a key-bit generator SG, into both of which a key word can be entered. The sync-word generator SYN is connected to the transmit key S of the radio set and to a comparator V. The comparator V is connected to a sync-word memory SP, a device E, and the key-bit generator SG. The device E is followed by a decrypting device ES. The key-bit generator SG is connected to an encrypting device VS and to the decrypting device ES.

In a first embodiment, during transmission, the generation in the sync-word generator SYN of a sync word dependent on the key word is initiated via the transmit key S. The sync word is fed to the comparator V, which compares it with the sync words stored in the sync-word memory SP. If the sync word is already contained in the memory, the comparator V causes another sync word to be generated in the sync-word generator SYN. The other sync word, too, is compared with the sync words contained in the sync-word memory SP. If the other sync word is not yet stored there, the comparator V causes it to be written in and, in addition, feeds it to the key-bit generator SG. The encrypting device VS then begins the encryption, places the sync word ahead of the encrypted data, and feeds the result to a transmitter circuit (not shown).

During reception (a receive circuit and a circuit for regenerating the received signals are not shown, either), the encrypted data is fed to the device E. There, the sync word is separated from the data and fed to the comparator V. The latter compares it with the sync words stored in the sync-word memory SP. If the received sync word is not stored yet, the comparator causes it to be written into the memory and sends a signal to the device E causing the latter to transfer the received data to the decrypting device. Otherwise, the data is not passed on to the decrypting device. This ensures that any information recorded and retransmitted by an unauthorized person (intercepter) is suppressed, since each sync word already used is stored and may be used only once.

In a second embodiment, after entry of the key word, a number of sync words are generated in all radio sets according to the same algorithm, and stored in the sync-word memory SP in the same order. At the beginning of an information transmission, only the memory address under which the sync word is stored in the sync-word memory SP is transmitted, not the entire sync word. In the duplex mode, with fast changes in direction of transmission, it is not even necessary to transmit the memory address. Instead, the respective next as-yet-unused sync word stored in the sync-word memory SP is used automatically for encryption and decryption.

To prevent recording interference, a second memory is required in this embodiment. Each location of the sync-word memory SP is assigned that location of the second memory which has the same address. If a given sync word is used for transmission of information, the associated location is marked (0 or 1) in the second memory. To detect recording interference, the comparator V no longer needs to compare the sync words but only has to determine whether a 0 or a 1 is present at the associated location of the second memory. This takes only few μs.

In a third embodiment, instead of the memory address of the sync word used for encryption, sync information is transmitted which is derived from the sync word according to an algorithm that may depend on the key word. This sync information, e.g., 16 bits, is used as the address of the second memory, which, like in the second embodiment, serves to mark sync words that have already been used. Since different sync words may lead to the same sync information, the number of available sync words is smaller than in the second embodiment, but security of transmission is higher.

If a further radio set enters into an existing radio circuit, it is possible for this radio set to interrogate the other radio sets for the sync words already used and to enter these words into its sync-word memory SP or mark the sync words already used.

The radio sets may be provided with an additional circuit which indicates any recording interference to the operator of the radio set in a suitable form.

We claim:

1. A secure two-way data transmission system comprising at least two transmitting/receiving stations for encrypted asynchronous digital information transmission wherein each station has associated cryptogear for encryption and decryption, said cryptogear comprising:

a PN generator which is adjustable by means of a key word and whose starting position is determined at the beginning of an information transmission by a sync word which is identified as part of the information transmission, sync word means for providing a sequence of candidate sync words, a circuit with a sync-word memory containing sync word usage information in which at least each of the sync words previously used is identified, the circuit accessing said sync word usage information prior to using a newly appearing sync word provided by said sync word means to encode information to be transmitted and prior to using a newly appearing sync word identified in a received transmission to decode the received encoded information, determining from the thus-accessed sync word usage information whether the newly appearing sync word has previously been used, and indicating whether the circuit detects prior usage of the newly appearing sync word, transmitting portion means responsive to prior usage so detected in the newly appearing sync word to be used in subsequently transmitted information to thereupon initiate the use of an as-yet-unused sync word, and receiving portion means responsive to prior usage so detected in the newly appearing sync word identified in received information to thereupon suppress the message associated with the newly appearing sync word.

2. A system as claimed in claim 1, characterized in that the sync words are generated dependent upon the respective key word.

3. A system as claimed in claim 2, wherein, upon entry of the key word, a number of sync words are generated in each of the stations according to the same algorithm and stored in each station's sync-word memory in the same order.

4. A system as claimed in claim 3, wherein, at least at the beginning of an information transmission, the memory address of the sync word associated with that information transmission is transmitted.

5. A system as claimed in claim 3, wherein, at least at the beginning of an information transmission, sync information identifying the sync word associated with that information transmission is transmitted.

6. A system as claimed in claim 5, wherein, in the further course of the information transmission and provided that the latter takes place on a duplex basis, no additional memory address or sync information is transmitted, but after each change in the direction of transmission, the respective following as-yet-unused sync word stored in the sync-word memory is used.

7. A system as claimed in claim 3, wherein, in the further course of the information transmission and provided that the latter takes place on a duplex basis, no additional memory address or sync information is transmitted, but after each change in the direction of transmission, the respective following as-yet-unused sync word stored in the sync-word memory is used.

8. A system as claimed in claim 4, wherein, in the further course of the information transmission and provided that the latter takes place on a duplex basis, no additional memory address or sync information is transmitted, but after each change in the direction of transmission, the respective following as-yet-unused sync word stored in the sync-word memory is used.

9. A system as claimed in claim 1, wherein a said sync word is unencoded form is included at the beginning of an information transmission.

* * * * *